United States Patent [19]
Hutchinson

[11] 3,887,439
[45] June 3, 1975

[54] SEPARATION OF FLUORINATED DIMETHYL ETHERS BY EXTRACTIVE DISTILLATION

[75] Inventor: William M. Hutchinson, Bartlesville, Okla.

[73] Assignee: Phillips Petroleum Company, Bartlesville, Okla.

[22] Filed: Sept. 25, 1972

[21] Appl. No.: 291,615

[52] U.S. Cl. .................. 203/63; 203/56; 203/50; 203/34; 260/616; 260/614 F
[51] Int. Cl. ............................................. B01d 9/00
[58] Field of Search ............ 260/653, 653.6, 614 F, 260/616; 203/67, 62

[56] References Cited
UNITED STATES PATENTS

| 2,066,905 | 1/1937 | Booth | 260/614 F |
|---|---|---|---|
| 2,500,388 | 3/1950 | Simons | 260/614 F |
| 2,519,983 | 8/1950 | Simons | 260/614 F |
| 2,549,609 | 4/1951 | Johnson | 203/50 |
| 3,274,081 | 9/1966 | Pearlson | 204/59 |
| 3,363,006 | 1/1968 | Olin | 260/614 F |
| 3,461,213 | 8/1969 | Terrell | 260/614 F |
| 3,469,011 | 9/1969 | Terrell | 260/614 F |

FOREIGN PATENTS OR APPLICATIONS

| 1,111,552 | 3/1956 | France | 204/59 |

Primary Examiner—Norman Yudkoff
Assistant Examiner—Frank Sever

[57] ABSTRACT

A process for the extractive distillation of fluorinated dimethyl ether, dimethyl ether and anhydrous hydrogen fluoride (HF) is described. Trifluoromethyl difluoromethyl ether ($F_5$) can be separated from dimethyl ether ($F_o$) by extractive distillation in the presence of anhydrous hydrogen fluoride (HF) as a selective solvent with the recovery of trifluoromethyl difluoromethyl ether ($F_5$) in a first effluent product stream and the recovery of dimethyl ether ($F_o$) and anhydrous hydrogen fluoride (HF) in a second effluent product stream. Bis-difluoromethyl ether ($F_4$) and/or monofluoromethyl difluoromethyl ether ($F_3$) can be separated from dimethyl ether and anhydrous hydrogen fluoride (HF) by extractive distillation in the presence of dimethyl ether ($F_o$) as a selective solvent with the recovery of bis-difluoromethyl ether ($F_4$) and/or monofluoromethyl difluoromethyl ether ($F_3$) and the recovery of anhydrous hydrogen fluoride (HF) and dimethyl ether ($F_o$) in a second effluent product stream. The use of anhydrous hydrogen fluoride (HF) and dimethyl ether ($F_o$) as the extractive solvents and the separation of the components of an electrochemical fluorination reaction is advantageous in that the anhydrous hydrogen fluoride (HF) and dimethyl ether ($F_o$) effluent stream can be recycled to the electrochemical fluorination reactions.

16 Claims, 1 Drawing Figure

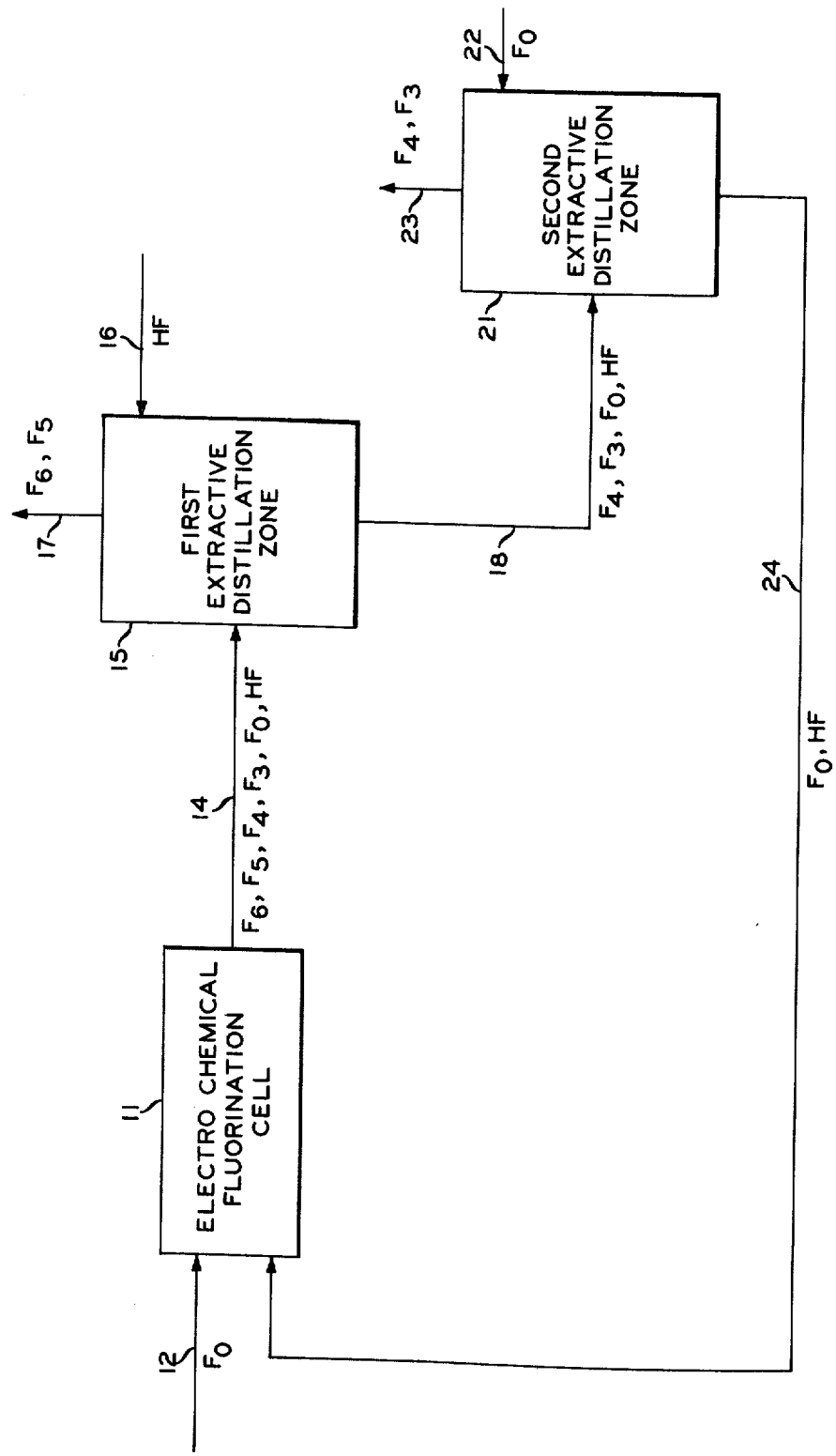

SEPARATION OF FLUORINATED DIMETHYL ETHERS BY EXTRACTIVE DISTILLATION

This invention relates to the extractive distillation of a mixture comprising a fluorinated dimethyl ether, dimethyl ether ($F_0$) and anhydrous hydrogen fluoride (HF) carried out in the presence of a suitable selective extractive distillation solvent.

Fluorination of dimethyl ether ($F_0$) to produce fluorinated dimethyl ethers is well known in the art, as illustrated in Fox, et al, U.S. Pat. No. 3,511,760, issued May 12, 1970. In the separation of the fluorinated dimethyl ether products produced by such processes as that described in Fox, et al. it has been found that under simple distillation separation procedures, fluorinated dimethyl ethers codistill with dimethyl ether ($F_0$) and/or anhydrous hydrogen fluoride (HF) within a wide temperature range which makes separation and purification of individual fluorinated dimethyl ether components difficult. It has been found to be particularly difficult to separate trifluoromethyl difluoromethyl ether ($F_5$) from dimethyl ether ($F_0$) and/or to separate bisdifluoromethyl ether ($F_4$) and/or monofluoromethyl difluoromethyl ether ($F_3$) from anhydrous hydrogen fluoride (HF). Heretofore no convenient process has been disclosed or described by the prior art for the separation of mixtures of fluorinated dimethyl ether, dimethyl ether ($F_0$) and HF with the recovery of individual fluorinated dimethyl ether components wherein suitable extractive distillation process conditions are employed.

It is an object of this invention to provide a process for the separation of a mixture of fluorinated dimethyl ether, dimethyl ether ($F_0$) and anhydrous hydrogen fluoride (HF). Another object is to separate difluoromethyl trifluoromethyl ether ($F_5$) from a mixture comprising difluoromethyl trifluoromethyl ether ($F_5$), dimethyl ether ($F_0$) and anhydrous hydrogen fluoride (HF). Still another object is to separate bis-difluoromethyl ether ($F_4$) and/or monofluoromethyl difluoromethyl ether ($F_3$) from a mixture comprising the aforesaid bis-difluoromethyl ether ($F_4$) and/or monofluoromethyl difluoromethyl ether ($F_3$), dimethyl ether ($F_0$) and anhydrous hydrogen fluoride (HF). A further object is to provide an electrochemical fluorination process which conveniently separates fluorinated dimethyl ethers from dimethyl ether ($F_0$) and HF and recycle of the dimethyl ether ($F_0$) and HF to the electrochemical fluorination reaction cell. These and other objects will be readily apparent from the following specification and appended claims.

In accord with this invention, it has been found that mixtures of fluorinated dimethyl ethers, dimethyl ether ($F_0$) and anhydrous hydrogen fluoride (HF) can be separated into fluorinated dimethyl ether and dimethyl ether/anhydrous hydrogen fluoride product stream by extractive distillation carried out in the pressence of a suitable extractive distillation solvent selected from anhydrous hydrogen fluoride (HF) or dimethyl ether ($F_0$) under suitable extractive distillation process conditions.

In general, in the practice of this invention, the separation of trifluoromethyl difluoromethyl ether ($F_5$) from dimethyl ether ($F_0$) is carried out under extractive distillation process conditions employing anhydrous hydrogen fluoride (HF) as a selective solvent for dimethyl ether ($F_0$). In general, the amount of anhydrous hydrogen fluoride (HF) employed as a selective solvent in the separation of trifluoromethyl difluoromethyl ether ($F_5$) from dimethyl ether ($F_0$) is any amount which adjusts sufficiently the total anhydrous hydrogen fluoride (HF) content of the mixture of trifluoromethyl difluoromethyl ether ($F_5$), dimethyl ether ($F_0$) and anhydrous hydrogen fluoride (HF) subjected to extractive distillation which results in the separation of a first effluent stream comprising a major portion of the trifluoromethyl difluoromethyl ether ($F_5$) and a second effluent stream comprising a major portion of the dimethylether ($F_0$) and a major portion of the anhydrous hydrogen fluoride (HF) under extractive distillation process conditions. Preferably the separation of trifluoromethyl difluoromethyl ether ($F_5$) from dimethyl ether ($F_0$) is carried out in the presence of sufficient anhydrous hydrogen fluoride (HF) to yield a first effluent overhead stream comprising trifluoromethyl difluoromethyl ether ($F_5$) substantially free of dimethyl ether ($F_0$), and a second effluent bottoms stream comprising dimethyl ether ($F_0$) and anhydrous hydrogen fluoride (HF) substantially free of trifluoromethyl difluoromethyl ether ($F_5$). Generally, sufficient anhydrous hydrogen fluoride (HF) is added to adjust the weight ratio of the anhydrous hydrogen fluoride (HF):dimethyl ether ($F_0$) subjected to extractive distillation process conditions to ratios within the range of from about 1:10 to about 10:1, preferably within the range of from about 1:3 to about 3:1, even more preferably within the range of from about 1:1.5 to about 1.5:1.

The extractive distillation can be carried out at any temperature and/or any pressure which does not deleteriously affect separation of the aforesaid first major portion ($F_5$) and second major portion ($F_0$) and major portion (HF) effluent streams. Generally suitable extractive distillation temperatures are within the range of from about $-35°$ C. to about $+35°$ C. during extractive distillation carried out at atmospheric pressure.

In the separation of bis-difluoromethyl ether ($F_4$) and/or monofluoromethyl difluoromethyl ether ($F_3$) from anhydrous hydrogen fluoride (HF), dimethyl ether ($F_0$) is employed as a selective solvent under extractive distillation conditions. In general, the amount of dimethyl ether ($F_0$) employed in the separation of bis-difluoromethyl ether ($F_4$) and/or monofluoromethyl difluoromethyl ether ($F_3$) from anhydrous hydrogen fluoride (HF) is any amount which adjusts sufficiently the total dimethyl ether ($F_0$) content of the mixture of bis-difluoromethyl ether ($F_4$) and/or monofluoromethyl difluoromethyl ether ($F_3$), anhydrous hydrogen fluoride (HF), and dimethyl ether (F) subjected to extractive distillation which results in the separation of a first effluent stream comprising a major portion of the bis-difluoromethyl ether ($F_4$) and/or a major portion of the monofluoromethyl difluoromethyl ether ($F_3$) and a second effluent stream comprising a major portion of the dimethyl ether ($F_0$) and a major portion of the anhydrous hydrogen fluoride (HF) under extractive distillation process conditions. Preferably the separation of bis-difluoromethyl ether ($F_4$) and/or monofluoromethyl difluoromethyl ether ($F_3$), anhydrous hydrogen fluoride (HF), and dimethyl ether ($F_0$) is carried out in the presence of sufficient dimethyl ether ($F_0$) to yield a first effluent overhead stream comprising bis-difluoromethyl ether ($F_4$) and/or monfluoromethyl difluoromethyl ether ($F_3$) substantially free of anhydrous hydrogen fluoride (HF) and dimethyl ether ($F_0$), and a second effluent bottoms stream comprising anhydrous hydrogen fluoride (HF) and dimethyl ether ($F_0$) substantially free of bis-difluoromethyl ether ($F_4$) and/or monofluoromethyl difluoromethyl ether ($F_3$). Generally, sufficient dimethyl ether ($F_0$) is added to adjust the weight ratios of the dimethyl ether ($F_0$):anhydrous hydrogen fluoride (HF) subjected to extractive distillation process conditions to ratios within the range of from about 1:10 to about 10:1, preferably within the range of from about 1:3 to about 3:1, even more preferably within the range of from about 1:1.5 to about 1.5:1. The extractive distillation can be carried out at any temperature and/or at any pressure which does not deleteriously affect separation of the first major portion ($F_4$) and/or ($F_3$), and second major portion ($F_0$) and (HF) effluent streams. Generally suitable extractive distillation temperatures are within the range of from about 10° C. to about 70° C. during extractive distillation carried out at atmospheric pressure.

In the drawing, the sole FIGURE is a schematic representation of a preferred embodiment of the process of the invention.

The use of anhydrous hydrogen fluoride (HF) or dimethyl ether ($F_0$) as a selective solvent in extractive distillation processes for the separation of fluorinated dimethyl ethers can advantageously be employed for separation of the reaction product effluent of electrochemical fluorination of dimethyl ether and recycle of anhydrous hydrogen fluoride (HF) and dimethyl ether ($F_0$) to the electrochemical fluorination reaction cell 11. Any convenient electrofluorination process can be employed which provides for passage of an electric current through a current-conducting liquid hydrogen fluoride electrolyte contained in an electrolysis cell provided with a cathode and an anode, passage of a feedstock 12 comprising dimethyl ether ($F_0$) to the electrolysis cell and into contact with the anode under fluorinating conditions. The reaction product effluent 14 of the electrolysis cell comprising bis-trifluoromethyl ether ($F_6$), trifluoromethyl difluoromethyl ether ($F_5$), bis-difluoromethyl ether ($F_4$), monofluoromethyl difluoromethyl ether ($F_3$), dimethyl ether ($F_0$) and anhydrous hydrogen fluoride (HF) is passed into a first extractive distillation zone 15. A sufficient amount of a selective solvent 16 comprising anhydrous hydrogen fluoride (HF) is passed into the first extractive distillation zone 15 to obtain under extractive distillation conditions, a first extractive distillation first effluent 17 comprising a major portion of the bis-trifluoromethyl ether ($F_6$) and trifluoromethyl difluoromethyl ether ($F_5$), and a first extractive distillation second effluent 18 comprising a major portion of the bis-difluoromethyl ether ($F_4$), monofluoromethyl difluoromethyl ether ($F_3$), dimethyl ether ($F_0$) and anhydrous hydrogen fluoride (HF). The first extractive distillation zone second effluent 18 comprising a major portion of the bis-difluoromethyl ether ($F_4$), monofluoromethyl difluoromethyl ether ($F_3$), dimethyl ether ($F_0$) and anhydrous hydrogen fluoride (HF) is passed into a second extractive distillation zone 21. A sufficient amount of a selective solvent 22 comprising dimethyl ether ($F_0$) is passed into the second extractive distillation zone 21 to obtain under extractive distillation conditions a second extractive distillation zone first effluent 24 comprising a major portion of the bis-difluoromethyl ether ($F_4$) and the monofluoromethyl difluoromethyl ether ($F_3$), and a second extractive distillation second zone second effluent 24 comprising a major portion of the dimethyl ether ($F_0$) and a major portion of the anhydrous hydrogen fluoride (HF). The second extractive distillation zone second effluent 24 comprising a major portion of the dimethyl ether ($F_0$) and a major portion of the anhydrous hydrogen fluoride (HF) is passed into the electrolysis cell 11 to provide at least a portion of the dimethyl ether ($F_0$) and anhydrous hydrogen fluoride (HF) reactant requirements of the electrochemical fluorination process.

An exemplary distillation illustrating the separation of individual fluorinated dimethyl ethers from mixtures comprising fluorinated dimethyl ethers, dimethyl ether and HF is set out in Table I hereafter. The data of Table I illustrates the distillation fractions and product distribution occurring during a distillation in the presence of HF and $F_0$ solvents of the 0° F. condensate recovered from the fluorination of dimethyl ethers in an electrofluorination operation. Table II, set out hereafter, defines the individual boiling points of the individual fluorinated dimethyl ethers. The distillation of Table I was carried out at about 745 millimeters Hg pressure in the presence of considerable HF and dimethyl ether. The distillation column was a cylinder 1.5 inches in diameter with a kettle having 150 milliliter capacity, was charged with 109.4 g. of liquid 0° F. condensate and the kettle containing the liquid condensate was cooled to −40° F. prior to initiation of the distillation. Heat was applied to the kettle and the column operated without reflux. Overhead fractions were collected, analyzed, and the data thereby obtained tabulated in Table I.

TABLE I

DISTILLATION OF 0° F. CONDENSATE AT ATMOSPHERIC PRESSURE

| Fraction | Temperature, °C. OHC* | Temperature, °C. KB* | Overhead Samples Net wt., g. | Cumulative Wt. % | Average Composition of Overhead Fraction, Wt. % $CHF_2OCF_3$ | $CH_3OCH_3$ | $CHF_2OCHF_2$ | $CH_2FOCHF_2$ | HF |
|---|---|---|---|---|---|---|---|---|---|
| 1 | −35 | −18 | 0 | — | — | — | — | — | — |
| 2 | −18 | 14 | 0 | — | — | — | — | — | — |
| 3 | 14 | 18 | 2.8 | 2.7 | 55.7 | 15.1 | 6.5 | 9.8 | 0 |
| 4 | 18 | 30 | 15.6 | 18.0 | 10.1 | 25.0 | 30.1 | 29.5 | 1.4 |
| 5 | 30 | 34 | 14.1 | 31.7 | 0.6 | 23.2 | 32.3 | 41.5 | 1.9 |
| 6 | 34 | 37.5 | 11.6 | 43.0 | 0 | 35.3 | 18.6 | 40.6 | 5.5 |
| 7 | 37.5 | 48 | 26.1 | 68.5 | 0 | 33.3 | 21.5 | 34.6 | 10.6 |
| 8 | 48 | 62 | 19.6 | 87.6 | 0 | 44.3 | 4.2 | 25.2 | 26.3 |
| 9 | 62 | 68.5 | 6.0 | 93.4 | 0 | 50.1 | 0 | 10.1 | 39.8 |
| 10 | Residue | Residue | 6.8 | | | | | | |

*OHC = overhead condensate temperature
*KB = kettle bottom temperature

TABLE II

BOILING POINTS OF FLUORINATED DIMETHYL ETHERS

| Compound | Boiling Point, °C. |
| --- | --- |
| $CF_3OCH_3$ - ($F_6$) | −59 |
| $CHF_2OCF_3$ - ($F_5$) | −35 |
| $CH_3OCH_3$ - ($F_0$) | −24 |
| $CF_3OCH_3$ - ($F_3$) | −23 |
| $CH_2FOCF_3$ - ($F_4$) | −20 |
| $CHF_2OCH_3$ - ($F_2$) | −5 |
| $CHF_2OCHF_2$ - ($F_4$) | 5 |
| $CH_2FOCH_3$ - ($F_1$) | 10 |
| Anhydrous Hydrogen Fluoride - HF | 19.4 |
| $CH_3FOCHF_2$ - ($F_3$) | 30 |
| $CH_3FOCH_2F$ - ($F_2$) | 33 |

As illustrated by the compositions of the overhead fractions tabulated in Table I, $F_5$ was successfully separated from $F_0$ in the presence of HF as selective solvent: Fraction 3 was rich in $F_5$ whereas fraction 10 was rich in $F_0$ and contained no $F_5$. Separation of $F_5$ and $F_0$ by simple distillation, i.e., in the absence of HF, was found to be impossible, apparently because of azeotrope formation.

The composition data in Table I also illustrate that $F_4$ and $F_3$ can be separated from HF by distillation in the presence of $F_0$ as selective solvent: note fraction 3 containing $F_4$ and $F_3$ but no HF. Fractions 4, 5 and 6 contain considerable $F_4$ and $F_3$ and very little HF. Separation of $F_4$ and $F_3$ from HF by simple distillation was found to be impossible, again apparently because of azeotrope formation.

In a commercial operation the feedstock resulting from electrochemical fluorination of dimethyl ether, such as that separated according to the data of Table I, is passed to the center of a first extractive distillation zone multi-tray fractionator. In the separation of $F_5$ from $F_0$ the HF selective solvent is passed to the top of the fractionator and descends downward through the trays of the fractionator to a reboiler at the bottom of the fractionator, and a substantially pure $F_5$ vapor product stream is recovered as an overhead product stream. The kettle product consists of the other components present in the feedstock plus the additional HF added at the top of the fractionator. Additionally, in the commercial operation, the kettle product from the aforesaid first extractive distillation zone is passed to the center of a second extractive distillation zone multi-tray fractionator. In the separation of $F_4$ and/or $F_3$ the $F_0$ selective solvent is passed to the top of the fractionator and descends downward through the trays of the fractionator to a reboiler at the bottom of the fractionator, and a substantially pure $F_4$ and/or $F_3$ vapor product stream is recovered as an overhead stream. A kettle product is separated from the fractionator which consists essentially of HF and $F_0$ which can be separated by ordinary distillation.

Other modifications and alterations of this invention will become apparent to those skilled in the art from the foregoing discussion and example and it should be understood that this invention is not to be unduly limited thereto.

I claim:

1. An extractive distillation process comprising:
    passing a first feedstock stream comprising trifluoromethyl difluoromethyl ether ($F_5$) and dimethyl ether ($F_0$) into a first extractive distillation zone;
    passing a first selective solvent stream comprising anhydrous hydrogen fluoride (HF) into said first extractive distillation zone;
    separating and withdrawing from said first extractive distillation zone a first overhead effluent stream comprising trifluoromethyl difluoromethyl ether ($F_5$); and
    separating and withdrawing from said first extractive distillation zone a first bottoms effluent stream comprising dimethyl ether ($F_0$) and anhydrous hydrogen fluoride (HF).

2. A process in accordance with claim 1 wherein said first overhead effluent stream is at least substantially free of dimethyl ether ($F_0$).

3. A process in accordance with claim 1 wherein dimethyl ether ($F_0$) and anhydrous hydrogen fluoride (HF) are present within said first extractive distillation zone in a ratio by weight of $F_0$:HF within the range of from about 1:10 to about 10:1.

4. A process in accordance with claim 3 wherein said ratio by weight of $F_0$:HF is within the range of from about 1:3 to about 3:1, wherein the temperatures within said first extractive distillation zone are within the range of from about −35°C. to about +35°C., and wherein the pressure within said first extractive distillation zone is about atmospheric pressure.

5. A process in accordance with claim 4 wherein said ratio by weight of $F_0$:HF is within the range of from about 1:1.5 to about 1.5:1.

6. A process in accordance with claim 1 wherein each of said first feedstock stream and said first bottoms effluent stream additionally comprises at least one additional component selected from the group consisting of bisdifluoromethyl ether ($F_4$) and monofluoromethyl difluoromethyl ether ($F_3$), and wherein said process additionally comprises:
    passing said first bottoms effluent stream into a second extractive distillation zone;
    passing a second selective solvent stream comprising dimethyl ether ($F_0$) into said second extractive distillation zone;
    separating and withdrawing from said second extractive distillation zone a second overhead effluent stream comprising said at least one additional component; and
    separating and withdrawing from said second extractive distillation zone a second bottoms effluent stream comprising dimethyl ether ($F_0$) and anhydrous hydrogen fluoride (HF).

7. A process in accordance with claim 6 wherein said first overhead effluent stream is at least substantially free of dimethyl ether ($F_0$), and wherein said second overhead effluent stream is at least substantially free of anhydrous hydrogen fluoride (HF) and dimethyl ether ($F_0$).

8. A process in accordance with claim 6 wherein dimethyl ether ($F_0$) and anhydrous hydrogen fluoride (HF) are present within said first extractive distillation zone in a ratio by weight of $F_0$:HF within the range of from about 1:10 to about 10:1, and wherein dimethyl ether ($F_0$) and anhydrous hydrogen fluoride (HF) are present within said second extractive distillation zone in a ratio by weight of $F_0$:HF within the range of from about 1:10 to about 10:1.

9. A process in accordance with claim 8 wherein said ratio by weight of $F_0$:HF within said first extractive distillation zone is within the range of from about 1:3 to about 3:1, wherein the temperatures within said first extractive distillation zone are within the range of from about −35°C. to about +35°C., wherein the pressure within said first extractive distillation zone is about atmospheric pressure, wherein said ratio by weight of $F_0$:HF within said second extractive distillation zone is within the range of from about 1:3 to about 3:1, wherein the temperatures within said second extractive distillation zone are within the range of from about 10°C. to about 70°C., and wherein the pressure within said second extractive distillation zone is about atmospheric pressure.

10. A process in accordance with claim 9 wherein said ratio by weight of $F_0$:HF within said first extractive distillation zone is within the range of from about 1:1.5 to about 1.5:1, and wherein said ratio by weight of $F_0$:HF within said second extractive distillation zone is within the range of from about 1:1.5 to about 1.5:1.

11. A process in accordance with claim 6 wherein said first feedstock comprises the effluent from an electrochemical fluorination reaction cell utilizing anhydrous hydrogen fluoride (HF) as an electrolyte in the fluorination of a cell feedstock comprising dimethyl ether ($F_0$), additionally comprising passing said second bottoms effluent stream into said electrochemical fluorination reaction cell to provide at least a portion of the dimethyl ether ($F_0$) and anhydrous hydrogen fluoride (HF) requirements of said electrochemical fluorination reaction cell.

12. A process for the separation by extractive distillation of fluorinated dimethyl ether and anhydrous hydrogen fluoride, said process comprising:

passing a feedstock stream comprising anhydrous hydrogen fluoride and at least one component selected from the group consisting of bis-difluoromethyl ether ($F_4$) and monofluoromethyl difluoromethyl ether ($F_3$) into an extractive distillation zone;

passing a selective solvent stream comprising dimethyl ether ($F_0$) into said extractive distillation zone;

separating and withdrawing from said at least one component; and separating and withdrawing from said extractive distillation zone a bottoms effluent stream comprising dimethyl ether ($F_0$) and anhydrous hydrogen fluoride (HF).

13. A process in accordance with claim 12 wherein said overhead effluent stream is at least substantially free of anhydrous hydrogen fluoride (HF).

14. A process in accordance with claim 12 wherein dimethyl ether ($F_0$) and anhydrous hydrogen fluoride (HF) are present within said extractive distillation zone in a ratio by weight of $F_0$:HF within the range of from about 1:10 to about 10:1.

15. A process in accordance with claim 14 wherein said ratio by weight of $F_0$:HF is within the range of from about 1:3 to about 3:1, wherein the temperatures within said extractive distillation zone are within the range of from about 10°C. to about 70°C., and wherein the pressure within said extractive distillation zone is about atmospheric pressure.

16. A process in accordance with claim 15 wherein said ratio by weight of $F_0$:HF is within the range of from about 1:1.5 to about 1.5:1.

* * * * *